US011310397B2

(12) United States Patent
Matsuo

(10) Patent No.: US 11,310,397 B2
(45) Date of Patent: Apr. 19, 2022

(54) IMAGE FORMING APPARATUS CAPABLE OF UPDATING PROFILES ON RESPECTIVE PRINTING SHEETS OF PLURALITY OF SHEET TYPES

(71) Applicant: KYOCERA Document Solutions Inc., Osaka (JP)

(72) Inventor: Masaru Matsuo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/230,844

(22) Filed: Apr. 14, 2021

(65) Prior Publication Data

US 2021/0329146 A1 Oct. 21, 2021

(30) Foreign Application Priority Data

Apr. 21, 2020 (JP) .............................. JP2020-075513

(51) Int. Cl.
*H04N 1/60* (2006.01)
*H04N 1/00* (2006.01)
(52) U.S. Cl.
CPC ....... *H04N 1/6094* (2013.01); *H04N 1/00045* (2013.01); *H04N 1/00087* (2013.01); *H04N 1/6097* (2013.01); *H04N 2201/0082* (2013.01)
(58) Field of Classification Search
CPC combination set(s) only.
See application file for complete search history.

(56) References Cited

U.S. PATENT DOCUMENTS

| 9,420,146 | B2* | 8/2016 | Kuehn | .................. H04N 1/6055 |
| 11,201,988 | B1* | 12/2021 | Morales | ............... H04N 1/6097 |
| 11,218,618 | B1* | 1/2022 | Morales | ............... H04N 1/6097 |

FOREIGN PATENT DOCUMENTS

JP 2010-252053 A 11/2010

* cited by examiner

*Primary Examiner* — Barbara D Reinier
(74) *Attorney, Agent, or Firm* — IP Business Solutions, LLC

(57) ABSTRACT

In an image forming apparatus, an arithmetic processing device functioning as a profile manager executes profile update processing: (a) by selecting one of a plurality of sheet types as a reference sheet type, allowing a printing device to print a colorimetric patch on a printing sheet of the reference sheet type to create an adjustment chart, generating a profile on the printing sheet of the reference sheet type based on a colorimetric result of the colorimetric patch, and updating the profile on the printing sheet of the reference sheet type stored in a storage device with the generated profile; and (b) by selecting each of the remaining sheet types as a target sheet type and calibrating the profile on a printing sheet of the target sheet type stored in the storage device, based on respective correspondence relation characteristics before and after the profile on the reference sheet type is updated.

6 Claims, 7 Drawing Sheets

IMAGE FORMING APPARATUS CAPABLE OF UPDATING PROFILES ON RESPECTIVE PRINTING SHEETS OF PLURALITY OF SHEET TYPES

INCORPORATION BY REFERENCE

This application claims priority to Japanese Patent Application No. 2020-075513 filed on 21 Apr. 2020, the entire contents of which are incorporated by reference herein.

BACKGROUND

The present disclosure relates to an image forming apparatus capable of updating the profiles on respective printing sheets of a plurality of sheet types.

Generally, an image processing apparatus as an example of an image forming apparatus includes a plurality of profiles according to various types of sheet. The general image processing apparatus corrects a print image based on a profile specific to a sheet to be used for printing, but, as for a profile-free sheet, generates a profile on the sheet from a known profile.

SUMMARY

A technique improved over the aforementioned technique is proposed as one aspect of the present disclosure.

An image forming apparatus according to an aspect of the present disclosure includes a storage device, an arithmetic processing device, and a printing device. The storage device stores a plurality of respective profiles describing respective correction characteristics corresponding to respective color reproducibilities of different printing sheets of a plurality of sheet types. The arithmetic processing device includes a processor and functions, through the processor executing a control program, as an image processor and a profile manager. The image processor corrects a print image in accordance with one of the plurality of profiles. The profile manager executes profile update processing of the plurality of profiles. The printing device prints, on a printing sheet of one of the plurality of sheet types, the print image corrected by the image processor in accordance with the profile on the one sheet type. The profile manager executes the profile update processing: (a) by selecting one of the plurality of sheet types as a reference sheet type, allowing the printing device to print a colorimetric patch on a printing sheet of the reference sheet type to create an adjustment chart, generating a profile on the printing sheet of the reference sheet type based on a colorimetric result of the colorimetric patch on the adjustment chart, and updating the profile on the printing sheet of the reference sheet type stored in the storage device with the generated profile; and (b) by selecting each of the plurality of sheet types other than the reference sheet type as a target sheet type and calibrating the profile on a printing sheet of the target sheet type stored in the storage device, without using an adjustment chart for the target sheet type, based on a correspondence relation characteristic between a correction characteristic shown by the profile on the reference sheet type and a correction characteristic shown by the profile on the target sheet type before the profile on the reference sheet type is updated and a correspondence relation characteristic between a correction characteristic shown by the profile on the reference sheet type and a correction characteristic shown by the profile on the target sheet type after the profile on the reference sheet type is updated.

DETAILED DESCRIPTION

Hereinafter, a description will be given of an embodiment of the present disclosure with reference to the drawings.

Figure 1:
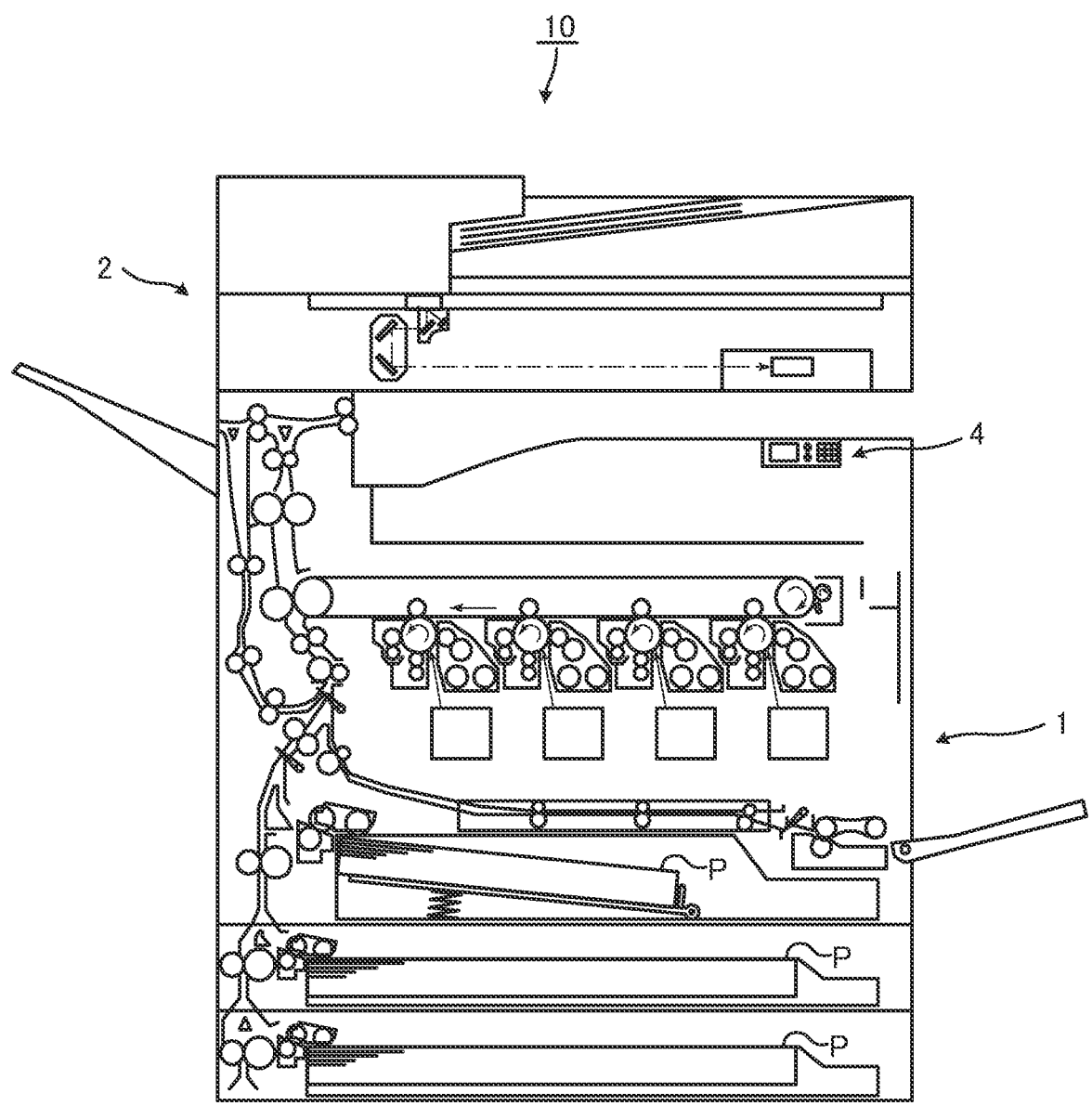
FIG. 1 is a frontal cross-sectional view showing the structure of an image forming apparatus according to an embodiment of the present disclosure.
Figure 2:
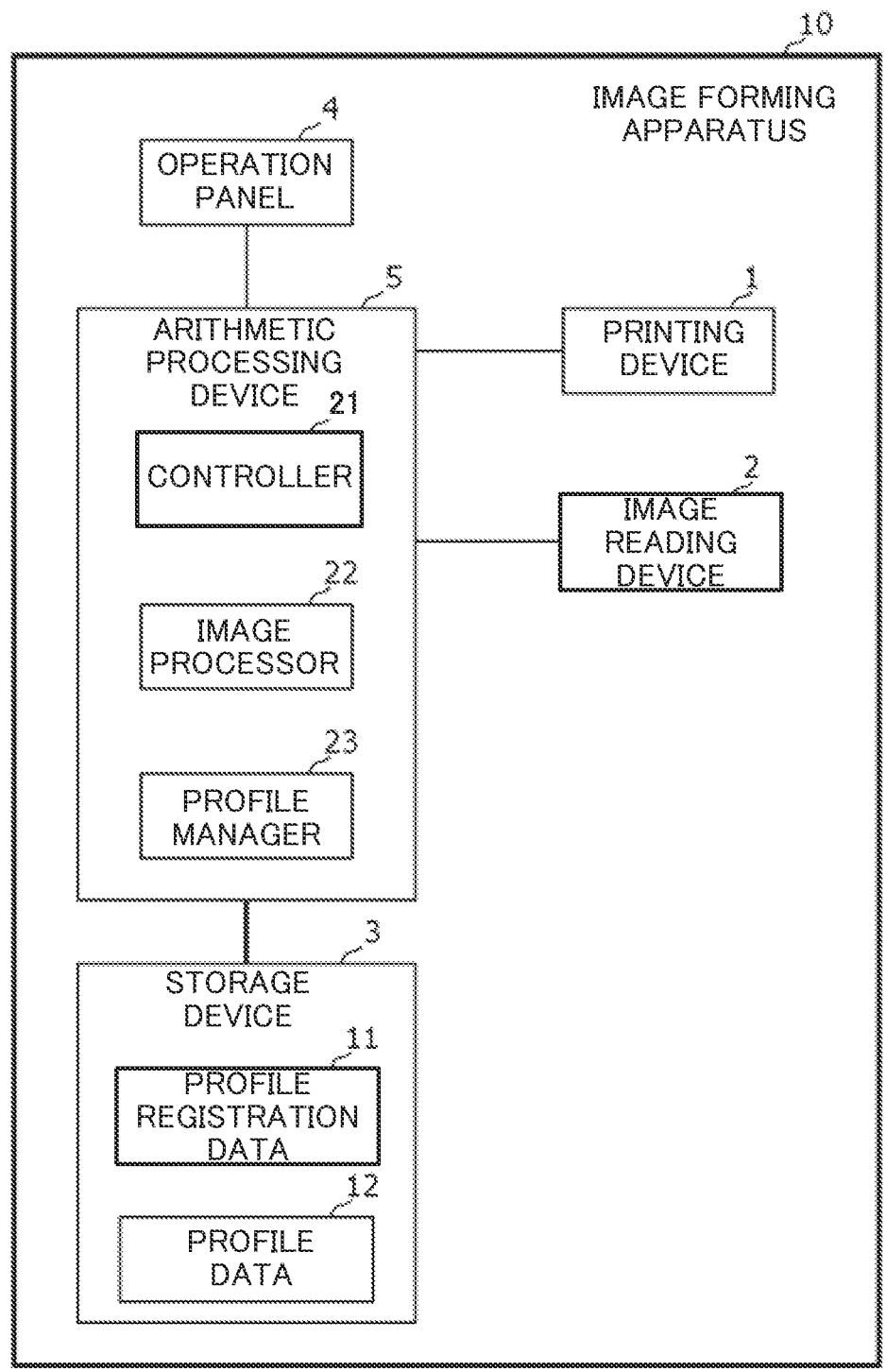
FIG. 2 is a block diagram showing an electrical configuration of the image forming apparatus according to the embodiment of the present disclosure.

FIG. 1 is a frontal cross-sectional view showing the structure of an image forming apparatus 10 according to an embodiment of the present disclosure. FIG. 2 is a block diagram showing an electrical configuration of the image forming apparatus 10. The image forming apparatus 10 according to this embodiment is a printer, a copier, a facsimile machine, a multifunction peripheral or like apparatus. As shown in FIG. 2, the image forming apparatus 10 includes a printing device 1, an image reading device 2, a storage device 3, an operation panel 4, and an arithmetic processing device 5.

The printing device 1 prints a print image on a printing sheet using an electrophotographic process, an ink-jet process or other processes.

The image reading device 2 optically reads an image of an original document from an original document sheet and generates image data representing the image of the original document.

The storage device 3 is a rewritable, non-volatile storage device (such as a flash memory or a hard disk drive) that stores data, programs and so on necessary for the control of the image forming apparatus 10. The storage device 3 holds profile registration data 11 and profile data 12.

The profile registration data 11 contains attribute data on a plurality of profiles contained in the profile data 12. The attribute data contains respective sheet types associated with the profiles, sheet type groups to each of which one or more sheet types belong, and so on.

The profile data 12 contains a plurality of respective profiles describing respective correction characteristics (including a color correction characteristic and a tone correction characteristic) corresponding to respective color reproducibilities of different printing sheets of the plurality of sheet types. In this embodiment, these profiles are ICC profiles.

Each of the plurality of profiles is implemented, for example, in the form of a look-up table. As also described hereinafter, in accordance with the profile according to each sheet type for printing sheets, the image processor 22 transforms the chromatic coordinate system (RGB coordinate system, CMY coordinate system, Lab coordinate system, X-Y-Z coordinate system or the like) of image data and the color tone (chromatic coordinate values) and so on of the image data or transforms the color tone and so on of the image data without transforming the chromatic coordinate system thereof.

For example, in the case where the profile describes correction characteristics in a specified chromatic coordinate system, the image processor 22 first transforms the chromatic coordinate system for image data from the original chromatic coordinate system to the chromatic coordinate system of the profile, then makes a correction (transformation) based on the profile, and, after the correction, transforms the chromatic coordinate system for the image data to a chromatic coordinate system according to the colors of color materials (toners or inks) for use in the printing device 1.

Each of the plurality of profiles is created to have such input-output characteristics that, regarding different printing sheets of different types on which images would be likely to be formed with different color reproducibilities, the images formed on these printing sheets exhibit substantially the same color reproducibility (or similar color reproducibilities falling within a given error range).

The color reproducibility as used herein refers to the colorimetric values (for example, at least one of brightness, hue, and saturation) of a series of colorimetric patches printed, in the image forming apparatus 10, on a printing sheet of a sheet type for which an adjustment chart should be created. The colorimetric values representing the color reproducibility of a printing sheet may be identified by reading and colorimetrically measuring the colorimetric patches with the image reading device 2 of the image forming apparatus 10 or may be identified by colorimetrically measuring the colorimetric patches with a dedicated colorimeter.

The operation panel 4 is disposed on the surface of a housing of the image forming apparatus 10. The operation panel 4 includes a display device, such as a liquid crystal display, and an input device, such as hard keys or a touch panel. In the operation panel 4, the display device displays various messages for a user and the input device accepts user's operations.

The arithmetic processing device 5 includes: a computer that operates in accordance with the control program; and an ASIC (application specific integrated circuit) or the like that executes predetermined operations, and functions as various processors. The computer includes a CPU (central processing unit), a ROM (read only memory), a RAM (random access memory), and so on. The computer loads into the RAM the control program stored in the ROM, the storage device 3 or like storages and executes the loaded control program with the CPU, thus functioning as various processors (together with the ASIC as necessary).

Here, the arithmetic processing device 5 functions as a controller 21, an image processor 22, and a profile manager 23.

The controller 21 executes a job requested by the user, using the printing device 1, the image reading device 2 or other controllable devices. For example, the controller 21 controls the printing device 1 to execute a print job requested by the user. In doing so, the controller 21 identifies a sheet type of a printing sheet specified by the request for the print job and identifies a profile according to the identified sheet type with reference to the profile registration data 11. The controller 21 then allows the image processor 22 to execute image processing (correction processing) of a print image specified by the request for the print job, using the identified profile.

The image processor 22 executes, on image data representing the print image to be printed on the printing sheet, predetermined phases of image processing, including RIP (raster image processing), color transformation, and halftoning.

Particularly, the image processor 22 executes color correction and tone correction of image data representing the print image in accordance with the profile according to the sheet type of the printing sheet. After the color correction and tone correction of the image data, the controller 21 allows the printing device 1 to perform printing based on the image data. The printing device 1 prints, on a printing sheet of one of the above-described plurality of sheet types (the sheet types the profiles on which are contained in the profile data 12), the print image corrected by the image processor 22 in accordance with the profile on the sheet type.

The profile manager 23 executes profile update processing of the above-described plurality of profiles.

Specifically, the profile manager 23 executes the profile update processing: (a) by selecting one of the above-described plurality of sheet types as a reference sheet type, allowing the printing device 1 to print a colorimetric patch on a printing sheet of the reference sheet type to create an adjustment chart, generating a profile on the printing sheet of the reference sheet type based on a colorimetric result of the colorimetric patch on the adjustment chart, and updating the current profile on the printing sheet of the reference sheet type stored in the storage device 3 with the generated profile; and (b) by selecting each of the above-described plurality of sheet types other than the reference sheet type as a target sheet type and calibrating the profile on a printing sheet of the target sheet type stored in the storage device 3, without using an adjustment chart for the target sheet type, based on a correspondence relation characteristic between a correction characteristic shown by the profile on the reference sheet type and a correction characteristic shown by the profile on the target sheet type before the profile on the reference sheet type is updated and a correspondence relation characteristic between a correction characteristic shown by the profile on the reference sheet type and a correction characteristic shown by the profile on the target sheet type after the profile on the reference sheet type is updated.

Figure 3:
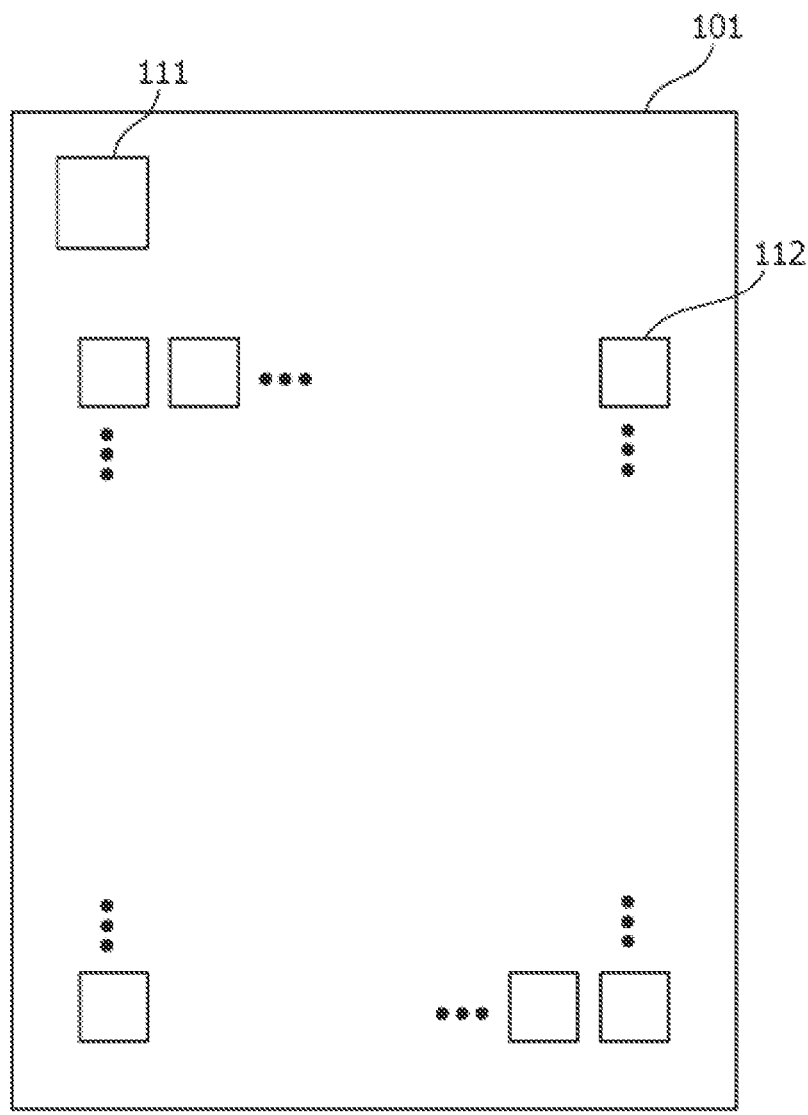
FIG. 3 is a view showing an example of an adjustment chart.

FIG. 3 is a view showing an example of an adjustment chart printed by the image forming apparatus 10. For example, as shown in FIG. 3, the printing device 1 prints on the adjustment chart 101 a visible code 111 (for example, a two-dimensional code, such as a QR code (registered trademark)) indicating a sheet type, and a plurality of colorimetric patches 112 showing colorimetric values and tone levels in a chromatic coordinate system. In the case where the colorimetry is performed by the image reading device 2, the profile manager 23 identifies the sheet type associated with the adjustment chart 101, based on a read image in which the visible code 111 is shown.

Figure 4:
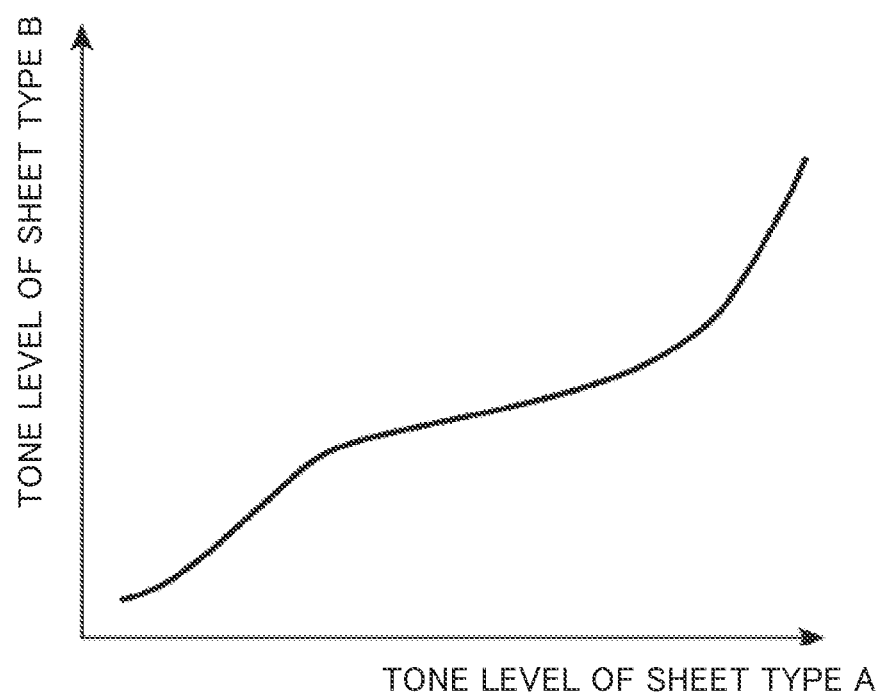
FIG. 4 is a graph showing an example of a correspondence relation characteristic in correction characteristic between sheet types.
Figure 5:
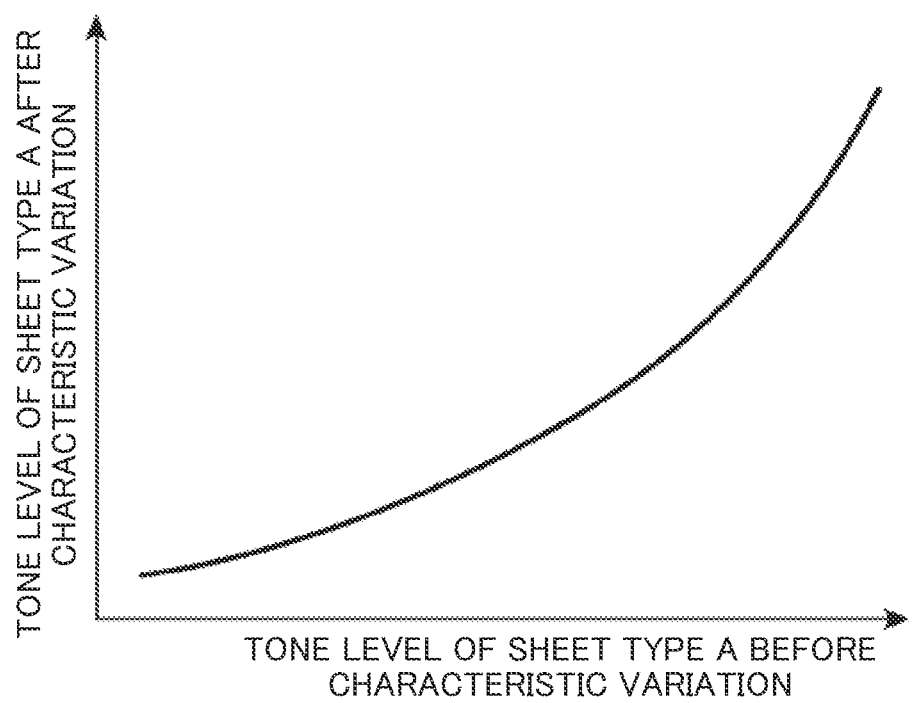
FIG. 5 is a graph showing an example of changes in color reproducibility caused by a characteristic variation of a printing mechanism.
Figure 6:
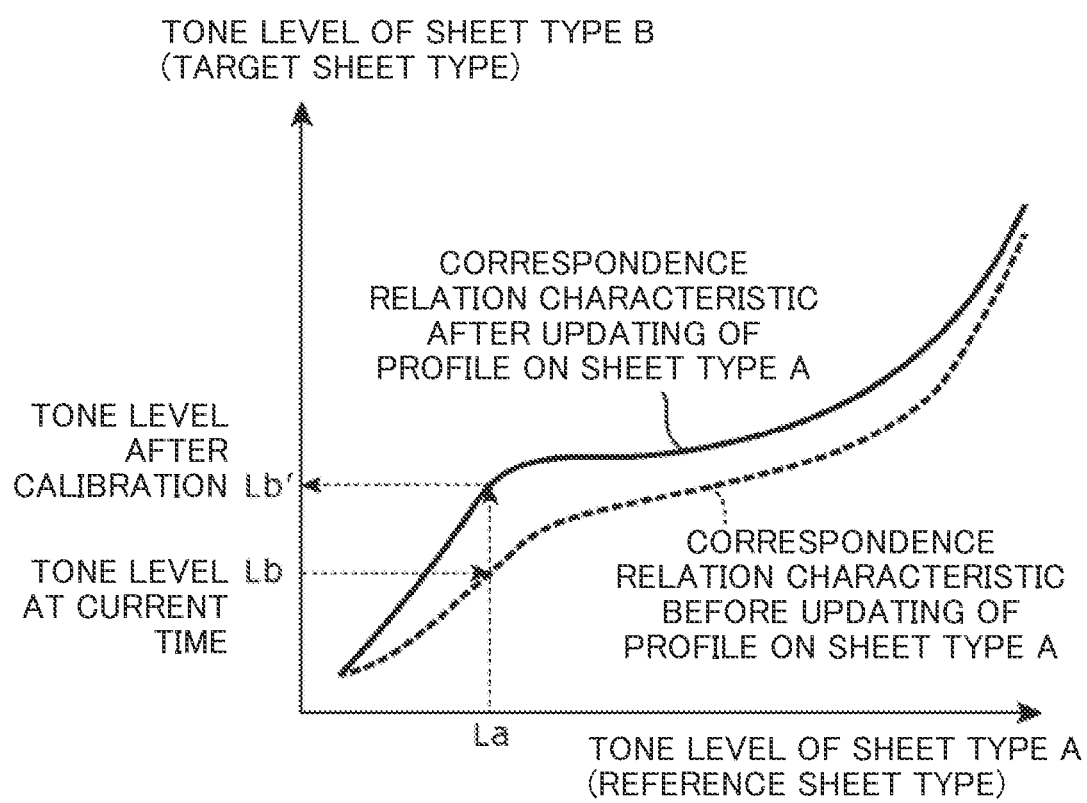
FIG. 6 is a graph for illustrating the calibration of a profile on a target sheet type.

FIG. 4 is a graph showing an example of a correspondence relation characteristic in correction characteristic between sheet types. FIG. 5 is a graph showing an example of changes in color reproducibility caused by a characteristic variation of a printing mechanism. FIG. 6 is a graph for illustrating the calibration of a profile on a target sheet type.

For example, the graph of FIG. 4 shows, as a correspondence relation characteristic in correction characteristic between sheet types, a correspondence relationship between the tone level of one sheet type A and the tone level of the other sheet type B. FIG. 4 shows a correspondence relation characteristic in terms of one coordinate (one dimension) in a chromatic coordinate system. Respective correspondence relation characteristics for the number of dimensions in the chromatic coordinate system are identified.

Specifically, the correspondence relation characteristic represents, based on a correction characteristic (input-output characteristic before and after the correction) which the profile on the reference sheet type includes and a correction characteristic (input-output characteristic before and after the correction) which the profile on the target sheet type includes, a correspondence relationship between two input values providing an identical output value in terms of the above two correction characteristics or a correspondence relationship between two output values provided by an identical input value in terms of the above two correction characteristics.

The color reproducibility changes due to characteristic variations of the printing mechanism. In other words, even though image data exhibits the same tone level, there is a difference in tone level between printed sheets of the same sheet type before and after a characteristic variation of the printing mechanism, for example, as shown in FIG. 5. If the profile on the reference sheet type (the sheet type A in this example) is updated on the occurrence of a characteristic variation of the printing mechanism, the correspondence relation characteristic between the reference sheet type (the sheet type A in this example) and the target sheet type (the sheet type B in this example) changes, for example, as shown in FIG. 6.

The profile manager 23 executes calibration of the profile on the target sheet type (the sheet type B in this example) in the following manner.

For example, as shown in FIG. 6, the profile manager 23 executes the profile calibration by: (a) identifying, based on a graph showing a correspondence relation characteristic before the profile is updated, respective tone levels La of the reference sheet type corresponding to respective tone levels Lb which are input or output values of the correction characteristic of the target sheet type; (b) identifying, based on a graph showing a correspondence relation characteristic after the profile is updated, respective tone levels Lb' of the correction characteristic of the target sheet type corresponding to respective tone levels La of the reference sheet type; and (c) changing the tone levels Lb of the correction characteristic of the target sheet type to the tone levels Lb'.

In the above manner, the profile manager 23 calibrates the profile of the target sheet type (the sheet type B in this example) based on the updating of the profile on the reference sheet type (the sheet type A in this example).

In this embodiment, the profile manager 23 executes the profile update processing for each of a plurality of sheet type groups each containing a plurality of sheet types grouped together in the same sheet type group based on color differences in a specified tone level of the above-described correction characteristic between the sheet types. Specifically, the profile manager 23 executes the profile update processing for each of the plurality of sheet type groups by: (a) selecting one reference sheet type per sheet type group and updating the profile on the reference sheet type; and then (b) selecting as a target sheet type each of sheet types other than the reference sheet type from the same sheet type group and updating the profile on a printing sheet of the target sheet type in the sheet type group based on the correspondence relation characteristics between the reference sheet type in the sheet type group and the target sheet type in the sheet type group. The profile manager 23 identifies, based on the profile registration data 11, each sheet type which belongs to the sheet type group.

The specified tone level described above is, for example, a white color of a printing sheet, the maximum density of each one-dimensional coordinate value in a chromatic coordinate system for a printing process of the printing device 1 (a chromatic coordinate system for ink or toner, for example, the CMYK coordinate system), or the darkest color representable by the printing device 1. The color difference described above is a color difference between respective input values of the correction characteristics of each pair of sheet types when the specified tone level is an output value, or a color difference between respective output values of the correction characteristics of each pair of sheet types when the predetermined tone level is an input value. For example, the color difference is calculated as the distance between two points in the chromatic coordinate system.

In terms of the color difference defined as above, the profile manager 23 groups a plurality of sheet types the color differences between which are within less than a predetermined threshold value together in the same sheet type group. For example, if the color difference between any pair of three or more sheet types is within less than the threshold value, the profile manager 23 groups these three or more sheet types together in the same sheet type group. As for each sheet type having a color difference of not less than the threshold value from any other sheet type, the profile manager 23 generates a sheet type group consisting only of the sheet type.

Alternatively, the profile manager 23 may group, with respect to every tone level (discrete values) of the correction characteristic described by each profile, a plurality of sheet types the color differences between which are within less than a predetermined threshold value together in the same sheet type group.

Thus, profiles having small color differences (i.e., sheet types having approximate color reproducibilities) can belong to the same sheet type group. Therefore, even when such profiles are calibrated based on the updating of the profile on the reference sheet type, a calibration error can be reduced because of the small color differences.

The profile manager 23 can add a profile on a new sheet type to the profile data 12. In adding a profile on a new sheet type to the profile data 12, the profile manager 23 prints, in accordance with a predetermined user's operation made on the input device of the operation panel 4, colorimetric patches on a printing sheet of the new sheet type to create an adjustment chart, generates a profile based on a colorimetric result of the colorimetric patches on the adjustment chart, adds the generated profile to the profile data 12, and adds attribute data on the added profile to the profile registration data 11. In doing so, in conjunction with the above data additions, the profile manager 23 identifies a sheet type group to which the new sheet type belongs.

Figure 7:
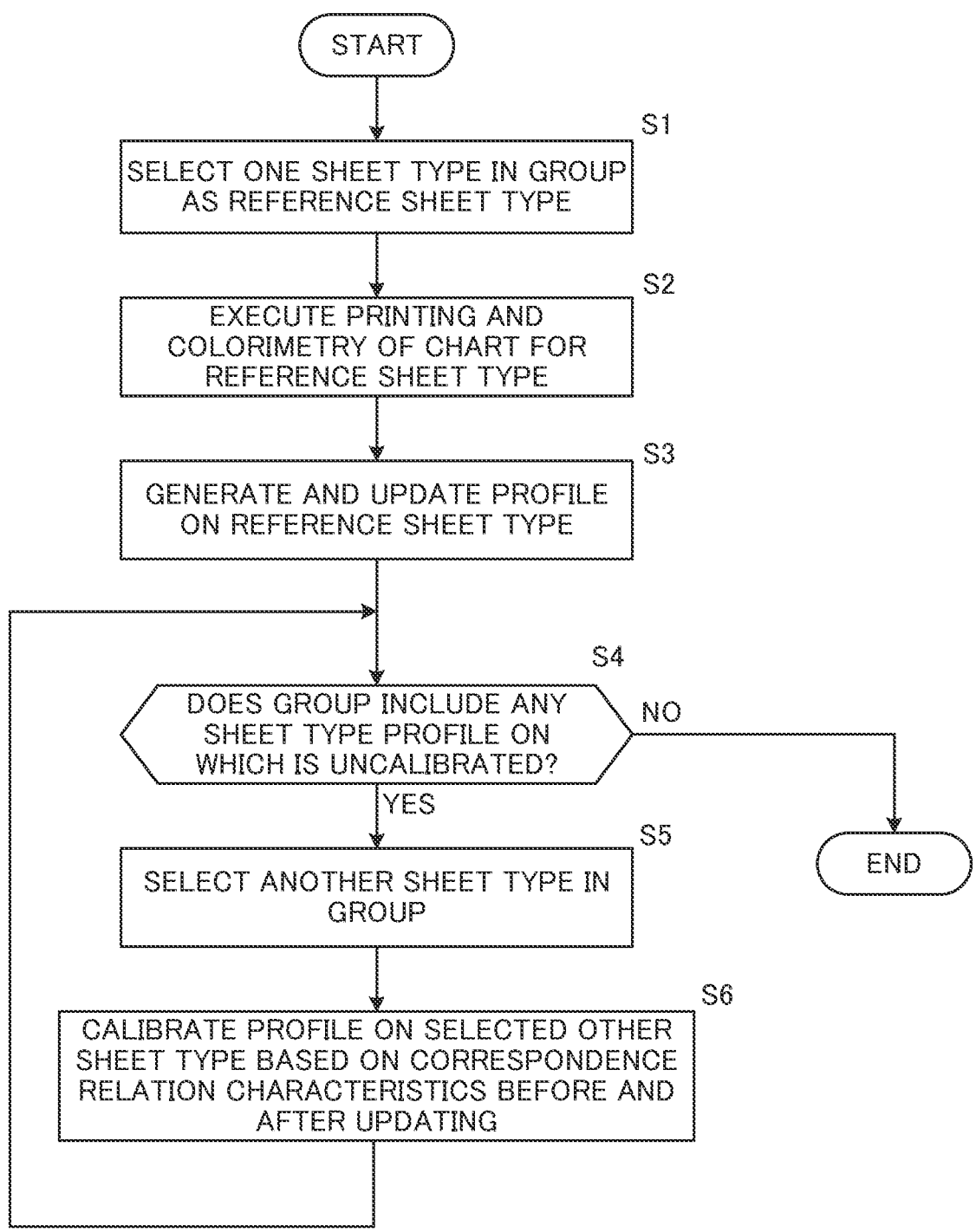
FIG. 7 is a flowchart for illustrating profile update processing.

Next, a description will be given of the operation of the image forming apparatus 10. FIG. 7 is a flowchart for illustrating profile update processing.

Upon acceptance of a request for a print job, the controller 21 identifies a sheet type of a printing sheet specified by the request and identifies a profile according to the identified sheet type. The controller 21 then specifies the identified profile to allow the image processor 22 to execute correction processing of a print image specified by the request for the print job and allow the printing device 1 to make a print of the print image having been subjected to the correction processing.

Furthermore, the controller 21 allows the profile manager 23 to execute the following profile update processing on a per sheet type group basis periodically or at specified times.

For example, when the time has come to execute profile updating, the controller 21 or the profile manager 23 allows the display device of the operation panel 4 to display the coming of the time and thus give notification of it to the user and allows the profile manager 23 to execute the profile update processing in accordance with a specified user's operation made on the input device of the operation panel 4 in response to the notification.

In the profile update processing, the profile manager 23 first selects one sheet type in the sheet type group as a reference sheet type in the manner previously described (step S1). After the processing in step S1, the profile manager 23 allows the printing device 1 to make a print of an adjustment chart for the reference sheet type and acquires a colorimetric result of the adjustment chart (step S2).

When the profile manager 23 acquires a colorimetric result, the user conducts the colorimetry of the adjustment chart. In conducting the colorimetry with the image reading device 2, the user places the adjustment chart in the image reading device 2 and does a predetermined user's operation on the operation panel 4. When the operation panel 4 detects the above user's operation, the profile manager 23 allows the image reading device 2 to read out an image of the adjustment chart to acquire a read image of the adjustment chart and identifies the colorimetric values of the colorimetric patches in the read image of the adjustment chart to acquire a colorimetric result. Alternatively, in conducting the colorimetry with a colorimeter, the user conducts the colorimetry of the adjustment chart with the colorimeter and inputs its colorimetric result with the operation panel 4. The profile manager 23 acquires the input colorimetric result.

After the processing in step S2, the profile manager 23 generates a profile on the reference sheet type based on the acquired colorimetric result by an existing method and updates the profile on the reference sheet type in the profile data 12 with the generated profile (step S3).

After the processing in step S3, the profile manager 23 determines whether or not the sheet type group includes any sheet type the profile on which is uncalibrated (step S4) and, in the absence of any sheet type the profile on which is uncalibrated (NO in step S4), ends the profile update processing.

On the other hand, if the sheet type group includes one or more sheet types the profiles on which are uncalibrated (YES in step S4), the profile manager 23 selects as a target sheet type one of the sheet types the profiles on which are uncalibrated (step S5) and calibrates the profile on the target sheet type based on the correspondence relation characteristics before and after the updating of the profile on the reference sheet type in the manner previously described (step S6).

When the calibration of the profile on the target sheet type is completed, the profile manager 23 goes back to the processing in step S4 and executes the above-described same processing (processing from steps S4 to S6) until the sheet type group no longer includes any sheet type the profile on which is uncalibrated (in other words, until the profiles on all the sheet types in the sheet type group have been updated or calibrated).

In the above embodiment, the profile manager 23 executes the profile update processing: (a) by selecting one of the plurality of sheet types as a reference sheet type, allowing the printing device 1 to print a colorimetric patch on a printing sheet of the reference sheet type to create an adjustment chart, generating a profile on the printing sheet of the reference sheet type based on a colorimetric result of the colorimetric patch on the adjustment chart, and updating the profile on the printing sheet of the reference sheet type stored in the storage device 3 with the generated profile; and (b) by selecting each of the plurality of sheet types other than the reference sheet type as a target sheet type and calibrating the profile on a printing sheet of the target sheet type stored in the storage device 3, without using an adjustment chart for the target sheet type, based on a correspondence relation characteristic between a correction characteristic shown by the profile on the reference sheet type and a correction characteristic shown by the profile on the target sheet type before the profile on the reference sheet type is updated and a correspondence relation characteristic between a correction characteristic shown by the profile on the reference sheet type and a correction characteristic shown by the profile on the target sheet type after the profile on the reference sheet type is updated.

As just described, in updating the respective profiles on respective printing sheets of a plurality of sheet types, printing and colorimetry of an adjustment chart are executed only for the reference sheet type and printing and colorimetry of adjustment charts for the remaining target sheet types need not be executed. Therefore, the profiles on respective printing sheets of a plurality of existing sheet types can be relatively easily updated.

Various changes and modifications of the above embodiment will be apparent to those skilled in the art. Such changes and modifications may be made without departing from the spirit and scope of the subject-matter of the present disclosure and without undermining the intended advantages. In other words, such changes and modifications are intended to be included in CLAIMS.

For example, in the above embodiment, the profile manager 23 may update the grouping of the above-described sheet type groups, based on color differences in the specified tone level of the above-described correction characteristic between the sheet types after the above profile update processing. In other words, because the above-described color difference may also be changed as a result of the profile update processing, the profile manager 23 may regroup the plurality of sheet types after the above-described profile update processing.

Furthermore, in the above embodiment, the profile manager 23 may select, as a reference sheet type from among the above-described plurality of sheet types, a sheet type different from the reference sheet type selected in the previous profile update processing. For example, the profile manager 23 may select, from among the above-described plurality of sheet types, reference sheet types in a predetermined order and in turns.

The present disclosure is applicable to, for example, an image forming apparatus.

While the present disclosure has been described in detail with reference to the embodiments thereof, it would be apparent to those skilled in the art the various changes and modifications may be made therein within the scope defined by the appended claims.

What is claimed is:
1. An image forming apparatus comprising:
 a storage device that stores a plurality of respective profiles describing respective correction characteristics corresponding to respective color reproducibilities of different printing sheets of a plurality of sheet types;
 an arithmetic processing device that includes a processor and functions, through the processor executing a control program, as an image processor capable of correcting a print image in accordance with one of the plurality of respective profiles and a profile manager capable of executing profile update processing of the plurality of respective profiles; and a printing device that prints, on a printing sheet of one of the plurality of sheet types, the print image corrected by the image processor in accordance with the profile on the one sheet type, wherein the profile manager executes the profile update processing:

(a) by selecting one of the plurality of sheet types as a reference sheet type, allowing the printing device to print a colorimetric patch on a printing sheet of the reference sheet type to create an adjustment chart, generating a profile on the printing sheet of the reference sheet type based on a colorimetric result of the colorimetric patch on the adjustment chart, and updating the profile on the printing sheet of the reference sheet type stored in the storage device with the generated profile; and (b) by selecting each of the plurality of sheet types other than the reference sheet type as a target sheet type, storing, before updating the profile on the reference sheet type, a first correspondence relation characteristic between a correction characteristic shown by the profile on the reference sheet type and a correction characteristic shown by the profile on the target sheet type on the storage device, and calibrating, after updating the profile on the reference sheet type, the profile on a printing sheet of the target sheet type stored in the storage device, without using an adjustment chart for the target sheet type, based on the first correspondence relation characteristic and a second correspondence relation characteristic between a correction characteristic shown by the updated profile on the reference sheet type and the correction characteristic shown by the profile on the target sheet type.

2. The image forming apparatus according to claim 1, wherein the profile manager executes the profile update processing for each of a plurality of sheet type groups each containing a plurality of same sheet types grouped together in the same sheet type group based on color differences in a specified tone level of the correction characteristic between the sheet types.

3. The image forming apparatus according to claim 2, wherein the profile manager updates grouping of the plurality of sheet type groups, based on color differences in the specified tone level of the correction characteristic between the sheet types after the profile update processing.

4. The image forming apparatus according to claim 1, wherein the profile manager selects, as the reference sheet type from among the plurality of sheet types, the sheet type different from the reference sheet type selected in the previous profile update processing.

5. The image forming apparatus according to claim 2, wherein the profile manager groups the plurality of the same sheet types the color differences between which are within less than a predetermined threshold value together in the same sheet type group.

6. The image forming apparatus according to claim 4, wherein the profile manager selects, from among the plurality of sheet types, reference sheet types in a predetermined order and in turns.

* * * * *